Feb. 23, 1926.
R. J. BOEHMER
TWO-CYCLE GAS ENGINE
Filed Oct. 5, 1922
1,574,062
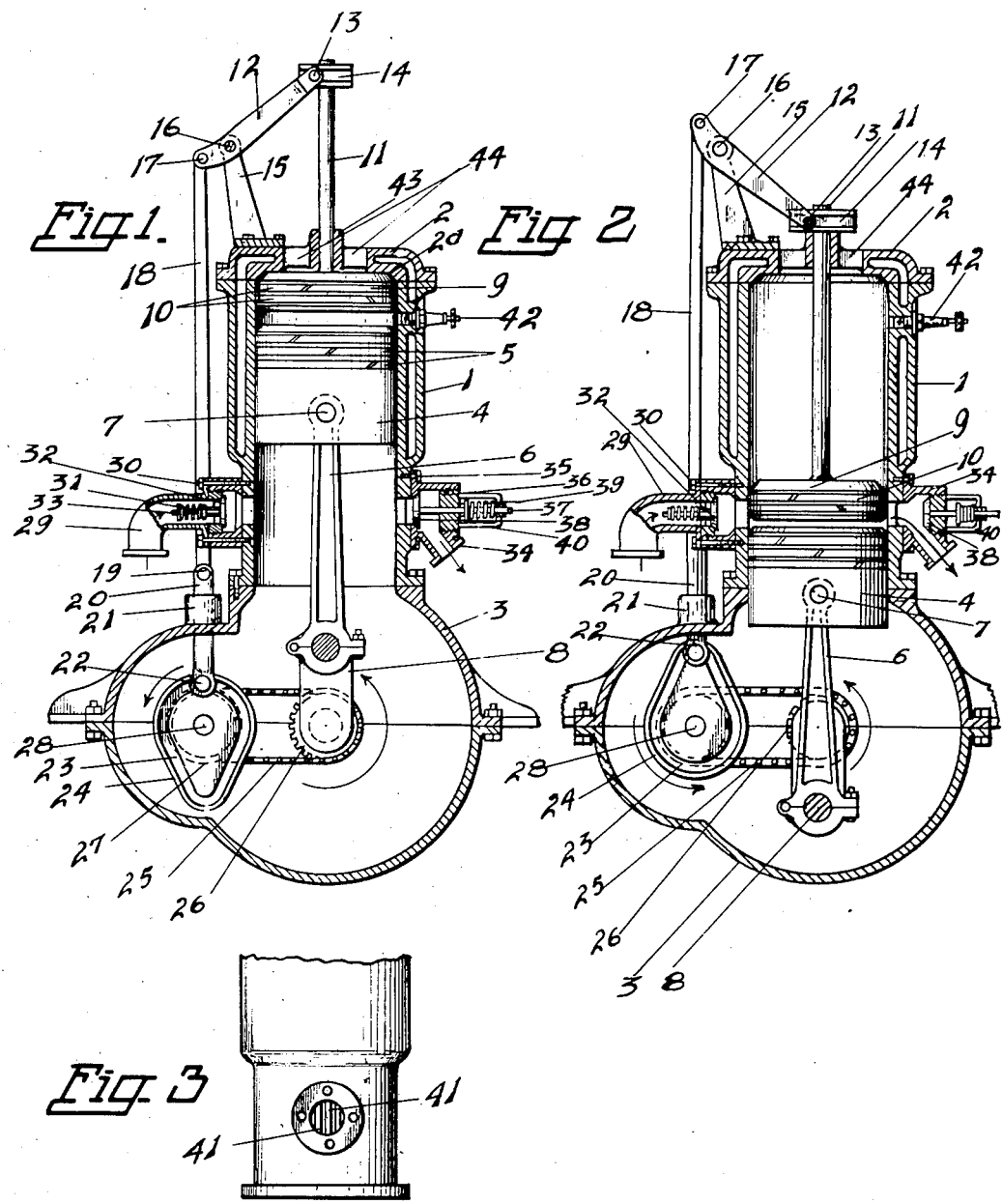

Patented Feb. 23, 1926.

1,574,062

UNITED STATES PATENT OFFICE.

RUDOLPH J. BOEHMER, OF PORTLAND, OREGON.

TWO-CYCLE GAS ENGINE.

Application filed October 5, 1922. Serial No. 592,655.

*To all whom it may concern:*

Be it known that I, RUDOLPH J. BOEHMER, a citizen of the United States, residing at Portland, in the county of Multnomah and the State of Oregon, and having his place of residence at 1487 Montana Avenue, in said city and State, have invented a new and useful Improvement in Two-Cycle Gas Engines, of which the following is a specification.

My invention relates to an improvement in internal combustion engines using hydrocarbon material as the means of creating the combustion and the improvement applies to the two cycle type, for in this type two explosions are obtained in each cylinder for each two cycles of operation of the cylinder instead of one in the four cycle type, my invention is a radical change in some respects over the common type of two cycle engines, in that I have, in effect, two pistons in each cylinder, one of which, has on its upper end, a valve head, instead of one, and both of the pistons carrying piston rings, a further change is that the intake valves are in the side of the vertical cylinder walls, one on either side, and the spark plug or means of ignition is also located on the side at the point of explosion, the motor is so designed that the upper piston, after the explosion of the charge and expansion takes place, moves in a rapidly accelerated movement downward and completely exhausts the charge of burned gas and then, in turn, is accelerated in the upward movement in advance of the travel of the operating piston, completely causes a second charge to be brought into the explosion chamber and is seated before the advance of the explosion and operating piston, thereby creating a two cycle motor.

The upper piston has a piston stem that passes through the cylinder head of the cylinder and to the exterior of the same and has a connection with a bell crank or rocker arm to which is attached operating means to operate and control the movement of the upper valve piston.

The ports through the cylinder for the exhaust and inlet gases are made in the form of slits or narrow openings in such manner that the piston rings will not foul in their operations past the same, and yet they are of sufficient area to permit the free passage of the exhaust and inlet gases therethrough.

Means are also provided for the easy securing of the inlet and exhaust valves to the cylinder walls whereby these valves may be, easy of access, to permit the repair, replacement, and grinding of the same as well as the valve seats.

The cylinder has a removable head which has a guide therein to permit the passage of the piston stem therethrough, it also has a valve seat machined on the under side of the same to permit the seating of the upper valve head of the piston, the cylinder head also has ports cast therein to permit the passage of free air therethrough thus preventing the forming of a vacuum on the downward passage of the upper piston, also preventing compression on the upward movement of the same.

For a better understanding of my invention reference is made to the accompanying drawings and specifications wherein a complete disclosure of the invention is made, and in which similar numerals refer to similar parts throughout the several views:

Fig. 1 is a section through the cylinder walls with the operating, or power piston at the full up part of the stroke, and in this position the charge of gas is under full compression and the charge is to be fired. Fig. 2 is a section view through the cylinder walls also, but the power or operating piston is at the full, or down position, of the stroke, and the secondary piston is at the full down stroke, also, clearly showing how completely this piston empties the cylinder of the exploded or spent gases. Fig. 3 is a detached side view of the exterior of the cylinder wall illustrating the port and the means of attaching the valve members thereto.

Similar reference numerals refer to similar parts throughout the several views;

1 is the cylinder wall and 2 is the cylinder head, 3 is the closure base, 4 is the compression or power piston having piston rings of the usual kind and construction, and attached to the piston in the customary manner, 6 is the connecting rod attached to the piston by means of a wrist pin 7 and is operated by the crank 8, 9 is the upper piston which seats to a ground and close fitting adjustment provided at $2^a$ in the piston head, attached to the piston is piston ring 10. I would prefer not to be limited to the use of one ring only and it may be found necessary upon further experimentation to provide more than one piston ring of the usual type in this piston. The piston terminates on its upper end in a piston stem 11, which is connected with and actuates bell crank 12 through pin 13 which is attached to the bell crank 12 and the same operates in a proper bearing 14 located in the upper end of stem 11. Bell crank 12 is held in position by bracket 15 which has journaled therein pin or shaft 16 about which the bell crank oscillates. Bell crank 12 also has attached to it operating means through pin or shaft 17 being attached to rod 18, the pin 17 being journaled in suitable bearings in the bell crank and being actuated by the movement of rod 18 which is secured at its lower end through the means of bearing 19 attached or secured to stem 20, this bearing is attached to stem 20 and the rod 18 is made to journal about the same, 21 is an alignment bearing which forms a bearing for 20 and at the same time insures that the same will operate in a straight line which is essential. Secured to the lower end of the stem 20 is a roller bearing 22 which is made to engage and follow the path or groove 23 located within the face of cam disk 24. A rotative motion as shown by the arrow is imparted to cam disk 24 as shown in Fig. 1, through the action of the chain 25 which is driven by sprocket 26 mounted upon crank 8, this chain also engages sprocket 27 mounted upon shaft 28 to which the cam disk 24 is made fast.

The carbureter side of the cylinder has inlet manifold 29 attached to the cylinder by means of bolts 30 and has mounted therein spring under tension 31 mounted upon valve stem 33 of valve 32, this valve is made to seat against a valve seat located in the inner end of inlet manifold 29, and the same can be easily removed or repaired by simply removing the manifold and by so doing the removal of the valve, valve stem, spring and all is accomplished at the same time.

Mounted upon the exhaust side of the cylinder is the exhaust manifold 34 which is secured to the cylinder wall by means of bolts or other fastenings 35. Also secured to the exhaust manifold 34 is a screw plug 36 having a bearing therein for the journaling of the valve stem 37 which has a valve head on its inner end 38 seating to a proper bearing or seat provided within the casting 34, seating pressure is provided upon this valve by means of the compression spring 39 and the same is housed by means of housing 40.

In order that the cylinder may be bored to a true diameter throughout its whole length slits 41 are provided in the inlet and exhaust ports as shown at 41 in Fig. 3, this provides a means for the safe passage of the piston rings past the ports without the same being damaged in their passage.

The spark plug is shown at 42, and the bearing of the stem of the upper piston is shown at 43 which is located in the piston head. To provide means for the free passage of the upper piston without creating of a vacuum on its down stroke, and compression on the up stroke ports 44 are provided within the piston head.

From the foregoing specification and description it will be clearly understood the operation of my two cycle engine, but a brief description of one cycle of operation may more clearly explain its operation so that any one skilled in the art could construct and operate the same, after the assembly of the motor and its operation is begun the cycle of operation would be as follows—In Fig. 2 the beginning of a cycle of operation is about to begin, the power piston is at the bottom of the stroke and the exhaust valve has been closed, the exhaust piston, or the upper piston has also reached the bottom of its stroke, and it will not return in its upward travel, the same being accelerated by the shape of the slot in the cam disk which raises the same, as the same travels in its upward position the inlet valve is opened and the fresh charge of the combustion mixture is admitted, this being accomplished the lower or power piston closes the inlet port valve by its passing the inlet port and the compressing of the mixture is accomplished as shown in Fig. 1, the explosion now takes place and the power piston is driven downward until the same passes the exhaust port and the exhaust valve is opened by the pressure and the exhausting of the exploded gases is complete due to the action of the upper or exhaust piston completing the discharging of the same. It will thus be seen that the cycle of operation is complete, and that a two cycle engine has been created.

Having thus described my invention I wish to make the following claim therefor—

In a two-cycle internal combustion engine, a cylinder, a pair of pistons reciprocating in said cylinder, packing rings carried by said pistons, circular exhaust and intake ports located in the walls of said cylinder at points within the range of travel of both pistons, a plurality of bars positioned in said ports and secured at their opposite ends to the cylinder to extend in the direction of travel of the pistons whereby damage to said rings while passing the ports will be eliminated, and means for actuating said pistons.

RUDOLPH J. BOEHMER.